United States Patent
Gogarty

[15] 3,648,773
[45] Mar. 14, 1972

[54] FLOODING WITH MICELLAR DISPERSIONS

[72] Inventor: William B. Gogarty, Littleton, Colo.
[73] Assignee: Marathon Oil Company, Findlay, Ohio
[22] Filed: Mar. 16, 1970
[21] Appl. No.: 20,100

[52] U.S. Cl. .................................................166/273
[51] Int. Cl. ................................................E21b 43/22
[58] Field of Search ....................166/273, 274, 275, 268

[56] References Cited

UNITED STATES PATENTS

| | | | |
|---|---|---|---|
| 3,500,918 | 3/1970 | Holm | 166/273 |
| 3,497,006 | 2/1970 | Jones et al. | 166/273 |
| 3,506,070 | 4/1970 | Jones | 166/273 |
| 3,343,597 | 9/1967 | Gogarty et al. | 166/273 |

*Primary Examiner*—Stephen J. Novosad
*Attorney*—Joseph C. Herring, Richard C. Willson, Jr. and Jack L. Hummel

[57] ABSTRACT

Oil recovery from a reservoir being flooded with a micellar dispersion and wherein the reservoir contains a relatively high concentration of divalent ions, is improved by incorporating into the micellar dispersion a relatively low equivalent weight sulfonate. For example, the sulfonate can have an average equivalent weight of about 300–450. The micellar dispersion can be followed by a mobility buffer and this in turn followed by a drive material, e.g., drive water to displace the micellar dispersion and mobility buffer toward a production well where oil is recovered.

13 Claims, No Drawings

3,648,773

FLOODING WITH MICELLAR DISPERSIONS

BACKGROUND OF THE INVENTION

1. Field of the Invention

This invention relates to the recovery of oil by injecting a miscible-type agent into a subterranean reservoir and displacing it through the reservoir toward a production well.

2. Description of the Prior Art

U.S. Pat. No. 3,254,714 to Gogarty et al. teaches the use of micellar solutions in the recovery of oil by injecting the micellar solution into the reservoir and displacing it therethrough and recovering crude oil through a production means in fluid communication with the reservoir. Efficient recovery of oil can be obtained using micellar solutions.

However, in reservoirs containing a high calcium content, recoveries with systems such as micellar solutions are adversely influenced due to the interaction of the calcium and the micellar dispersion, etc. It is desired that this adversity be overcome to optimize the recovery of the crude oil from the reservoir.

U.S. Pat. No. 3,343,597 to Gogarty et al. teaches the use of an aqueous preslug ahead of a micellar solution to protect the micellar solution from ions within formation water during secondary-type oil recovery processes. The aqueous preslug has a controlled ion content, especially at the trailing edge of the preslug. At the trailing edge, the ions are preferably at equilibrium with the ion content in the water within the micellar system. About 1 to 3 percent formation pore volume of the aqueous preslug is useful to insulate the micellar system from the ions within the formation water.

SUMMARY OF THE INVENTION

Applicant has discovered a novel method of improving the oil recovery from a reservoir containing a relatively high concentration of divalent ions in the formation water and wherein a micellar solution is used to displace the oil therefrom, the method comprising designing the micellar solution with a low average equivalent weight surfactant, e.g., a sulfonate having an average equivalent weight of about 250-450. A mobility buffer can be injected after the micellar dispersion and the micellar dispersion and mobility buffer displaced through the formation with a drive material such as drive water.

DESCRIPTION OF PREFERRED EMBODIMENTS OF INVENTION

The micellar dispersions useful with this invention can be oil-external or water-external. Examples of useful dispersions include those defined in U.S. Pat. Nos. 3,254,714 to Gogarty et al.; 3,497,006 to Jones et al.; copending U.S. Pat. applications identified as Ser. Nos. 693,099 and 693,125 to Jones, filed Dec. 26, 1967.

In general, the micellar dispersion is comprised of hydrocarbon, aqueous medium and surfactant. Optionally, cosurfactant and/or electrolyte can be incorporated into the dispersion. The hydrocarbon can be crude oil, a partially refined fraction of crude oil or a refined fraction of crude oil, or a synthesized hydrocarbon. The surfactant can be cationic, anionic, or nonionic. However, at least a portion of the surfactant must be a monovalent cation containing sulfonate, having an average equivalent weight within the range of about 300 to about 450 and more preferably about 325 to about 350. It is preferred that the total surfactant within the micellar dispersion have an average equivalent weight of about 300-450; about 10 percent or more can have an average equivalent weight of about 325-350.

The aqueous medium can be soft water, brine water, or brackish water. The cosurfactant, also identified as semipolar organic compound and cosolubilizer, can be an alcohol, ester, ether, amide, amino compound, aldehyde, or like material containing about 1 to about 20 or more carbon atoms. The electrolyte can be one that is weakly or strongly ionized and is preferably an inorganic salt, inorganic acid, or inorganic base.

From about 1 percent to about 20 percent or more formation pore volume of the micellar dispersion is useful to recover crude oil from a permeable formation. More preferably, about 2 to 5 percent formation pore volume is preferred. A preslug of water optionally containing ions can be injected prior to the micellar dispersion, formation pore volumes up to 100 percent or more are useful for this purpose.

The micellar dispersion can be followed by a mobility buffer. Examples of volume amounts useful with this invention include about 5 percent or less to about 75 percent or more of the mobility buffer. The mobility buffer can be a liquid or gas or combination of the two and can be hydrocarbon or an aqueous material. The mobility buffer contains a mobility-reducing agent which can be any agent which is compatible with the mobility buffer and which will effectively reduce the mobility of the mobility buffer flowing within the formation. Examples of mobility buffers include high molecular weight, partially hydrolyzed polyacrylamides, polysaccharides, polyisobutylenes, high molecular weight nonionic compounds, natural polymers, etc.

The micellar dispersion is displaced through the formation with a drive material. As mentioned above, the mobility buffer can follow the micellar dispersion and in this case the drive material displaces the micellar dispersion and mobility buffer through the formation. The drive material can be substantially hydrocarbon or substantially aqueous. Preferably, the drive material is one compatible with the back portion of the mobility buffer, and with the ions within the formation.

The following examples are presented to teach specific working embodiments of the invention. The invention is not intended to be limited by the specifics taught herein; rather, all equivalents obvious to those skilled in the art are intended to be incorporated within the scope of the invention as defined within the specification and appended claims. Unless otherwise specified, all percents are based on volume.

EXAMPLE 1

Clean Berea sandstone cores, 4 feet long by 3 inches in diameter and having characteristics as identified in Table II, are first flooded with water containing 18,000 p.p.m. of total dissolved solids of which 800 p.p.m. are calcium and magnesium carbonates. Thereafter, the cores are flooded with a crude oil (viscosity = 5.5 at ambient temperature) to residual water saturation, and then the cores are flooded with water (containing 12,000 p.p.m. of total dissolved solids of which 700 p.p.m. are calcium and magnesium carbonates) to residual oil saturation. The cores are then flooded with 2 percent formation pore volume of a micellar dispersion defined in Table I:

TABLE I

Micellar Dispersion Composition

| Component | A (%) | B (%) | C (%) | D (%) | E (%) |
|---|---|---|---|---|---|
| Surfactant*: | | | | | |
| ammonium petroleum sulfonate, avg. eq. wt.=439 | 7.94 | 7.21 | 6.04 | 5.70 | 4.06 |
| Petronate HL avg. eq. wt.=460 | | 0.40 | 0.76 | 1.22 | 2.03 |
| Pyronate 50 avg. eq. wt.=338 | | 0.40 | 0.76 | 1.22 | 2.03 |
| Hydrocarbon: | | | | | |
| crude oil, 5-6 cp. at ambient temperature | 39.62 | 39.62 | 39.59 | 39.58 | 39.62 |
| carrier oils | 1.42 | 1.47 | 1.97 | 1.34 | 3.8 |
| Aqueous medium: (contains 5,000 p.p.m. NaCl and 700 p.p.m. other dissolved salts) | 49.12 | 49.47 | 49.23 | 50.49 | 48.63 |
| Cosurfactant: | | | | | |
| isopropanol | 0.09 | 0.06 | 0.06 | 0.07 | 0.07 |
| primary amyl alcohol | 1.66 | 1.51 | 1.83 | 0.68 | 1.82 |
| Total = | 100.15 | 100.14 | 100.24 | 100.30 | 100.34 |

*100% active

After the micellar dispersion is injected into the cores, there is injected 1.2 pore volumes of a mobility buffer. The mobility buffer is water containing about 400–500 p.p.m. of total dissolved solids, and containing 1,200 p.p.m. of Pusher 530 (a trademark of Dow Chemical Company identifying a high molecular weight, partially hydrolyzed polyacrylamide). Results of the tests are indicated in Table II:

TABLE II

| Run | Core characteristics | | | Micellar dispersion | | Total hydrocarbon recovered |
|---|---|---|---|---|---|---|
| | K. (md.) | φ (Porosity) | Residual oil saturation | Percent PV | Type | |
| 1 | 678.2 | 0.212 | 0.375 | 2 | A | 63.4 |
| 2 | 594.0 | 0.216 | 0.393 | 2 | B | 64.2 |
| 3 | 975.3 | 0.224 | 0.383 | 2 | C | 66.2 |
| 4 | 638.5 | 0.214 | 0.380 | 2 | D | 75.3 |
| 5 | 775.7 | 0.223 | 0.380 | 2 | E | 83.6 |

The above data indicate that micellar dispersions "A," "B" and "C" do not give as good recovery as dispersions "D" and "E." The latter micellar dispersions contain increasing amounts of lower equivalent weight sulfonates. For example, micellar dispersion "A" has an average equivalent weight of 439 whereas micellar dispersion "E" has a surfactant composed of 50 percent of the surfactant within micellar dispersion "A" and 50 percent of a sulfonate mix containing 50 percent of equivalent 460 and 50 percent of a sulfonate having an equivalent weight of 338.

What is claimed is:

1. In a process of recovering crude oil from a subterranean formation having at least one injection means in fluid communication with at least one production means and wherein a micellar dispersion is injected into the formation and displaced toward the production means to recover crude oil and also wherein the subterranean formation contains a relatively high concentration of divalent cations, the improved process comprising incorporating as a portion of surfactant within the micellar dispersion a monovalent cation-containing petroleum sulfonate having an average equivalent weight of about 300 to about 450.

2. The process of claim 1 wherein the monovalent cation containing petroleum sulfonate has an average equivalent weight within the range of about 325 to about 350.

3. The process of claim 1 wherein the micellar dispersion is oil-external.

4. The process of claim 1 wherein the micellar dispersion is water-external.

5. The process of claim 1 wherein from about 1 percent to about 20 percent formation pore volume of the micellar dispersion is injected into the formation.

6. The process of claim 1 wherein the micellar dispersion contains at least about 4 percent surfactant.

7. The process of claim 6 wherein at least 10 percent of the surfactant is composed of a monovalent cation-containing petroleum sulfonate having an average equivalent weight within the range of about 300 to about 450.

8. An improved process of recovering crude oil from subterranean formation containing a relatively high concentration of divalent ions and wherein a micellar dispersion is injected into the reservoir through at least one injection means and displaced toward at least one production means to recover crude oil through said production means, and wherein the micellar dispersion is comprised of at least 4 percent surfactant, hydrocarbon, and aqueous medium, the process comprising designing the dispersion so that at least 10 percent of the surfactant is a monovalent cation-containing petroleum sulfonate having an average equivalent weight within the range of about 300 to about 450.

9. The process of claim 8 wherein a mobility buffer is injected behind the micellar dispersion.

10. The process of claim 8 wherein up to 100 percent formation pore volume of an aqueous slug is injected previous to the micellar dispersion.

11. The process of claim 8 wherein the micellar dispersion is oil-external.

12. The process of claim 8 wherein an aqueous mobility buffer is injected behind the micellar dispersion.

13. The process of claim 8 wherein an aqueous drive material displaces the micellar dispersion and mobility buffer toward the production means.